Aug. 11, 1942.  E. A. JOHNSTON ET AL  2,292,945
APPARATUS FOR MAKING PICKER SPINDLES
Filed April 1, 1939  4 Sheets-Sheet 1

Aug. 11, 1942.   E. A. JOHNSTON ET AL   2,292,945
APPARATUS FOR MAKING PICKER SPINDLES
Filed April 1, 1939   4 Sheets-Sheet 3
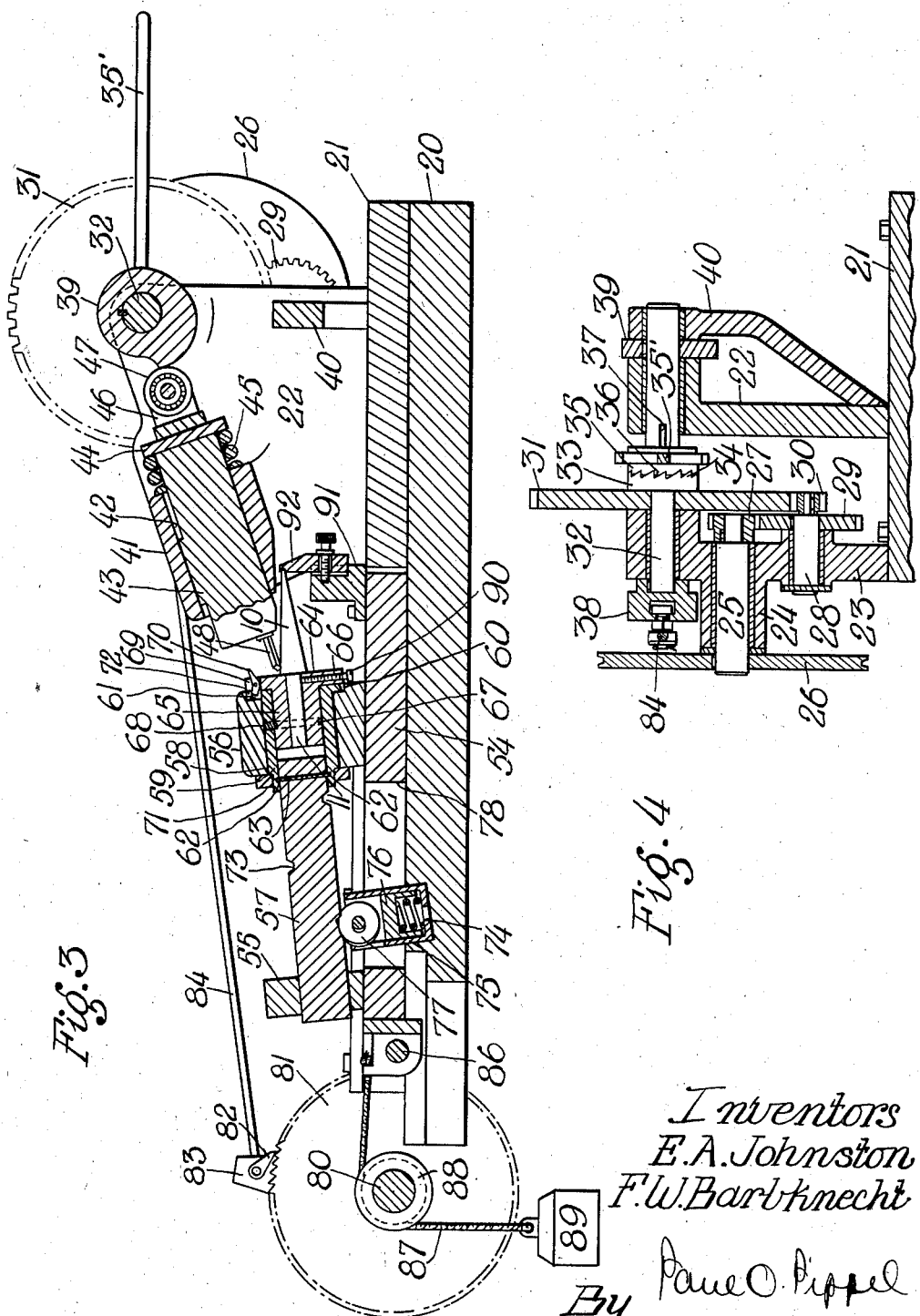
Inventors
E.A. Johnston
F.W. Bartknecht
By Paul O. Pippel
Atty.

Aug. 11, 1942. E. A. JOHNSTON ET AL 2,292,945
APPARATUS FOR MAKING PICKER SPINDLES
Filed April 1, 1939 4 Sheets-Sheet 4
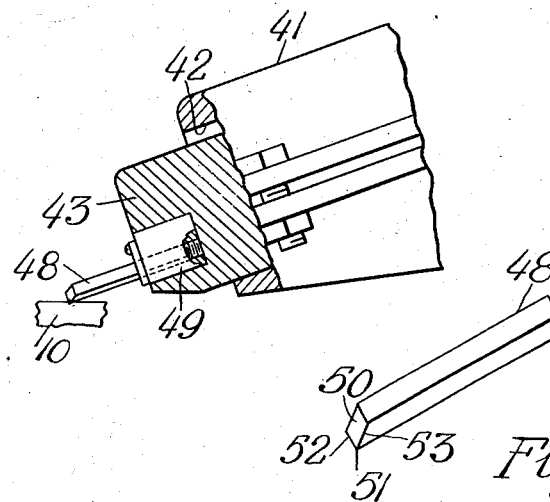
Fig. 6
Fig. 7
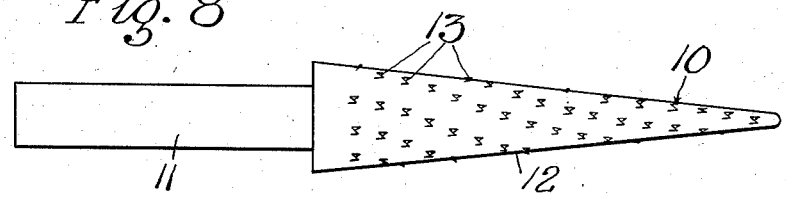
Fig. 8
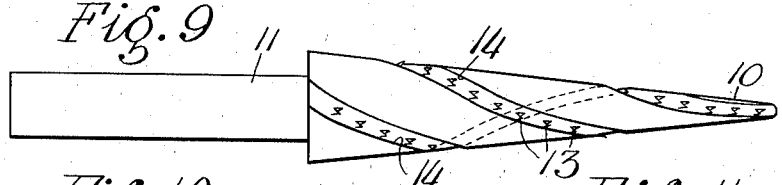
Fig. 9
Fig. 10 Fig. 11
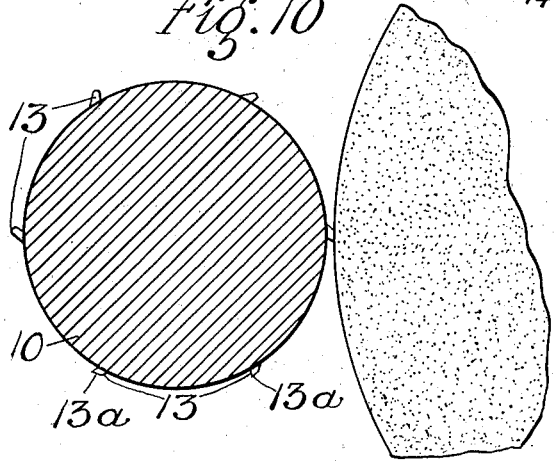
Inventors
E. A. Johnston
F. W. Barbknecht
By Paul O. Pippel
Atty.

Patented Aug. 11, 1942

2,292,945

UNITED STATES PATENT OFFICE 2,292,945

APPARATUS FOR MAKING PICKER SPINDLES

Edward A. Johnston, Chicago, and Fred W. Barbknecht, Worth, Ill., assignors to International Harvester Company, a corporation of New Jersey Application April 1, 1939, Serial No. 265,410

5 Claims. (Cl. 29—1)

This invention relates to cotton pickers, and more particularly to an improved apparatus for making picker spindles.

In a preferred type of cotton picker or harvester, the picking machine comprises a main frame having a picking unit mounted at one side thereof adapted to travel along a row of cotton. The unit preferably comprises a pair of transversely spaced picking drums, each of which includes a plurality of circumferentially spaced, vertically extending picking bars. Each picking bar comprises a plurality of vertically spaced, horizontally extending picking spindles which are provided with picking means in the form of teeth or the like adapted to pick cotton from bolls on the plant. A particular type of cotton picker is shown in applicant Johnston's Patent No. 2,140,631, issued December 20, 1938. In this particular type of machine the spindle supporting bars are adapted to swing about their axes, so that the spindles are caused to enter the cotton plant in one position and to be disposed later in a different position with respect to the doffing mechanism. These picker bars are of the so-called oscillating type. In designing an effective cotton picker spindle, a conflict of considerations with respect to the picking and doffing functions creates a major problem, and it is of special importance that the picking teeth be arranged on the spindle in a manner permitting highly efficient picking and permitting the same degree of efficiency in doffing the picked cotton. For this purpose it has been found desirable to use conical spindles which are mounted in the picker bar so that the upper elements of the conical surface move through a horizontal plane as the spindle revolves. The under surface of the circular doffing means is disposed in the same horizontal plane and a particularly large area of the spindle is thus doffed as the picking bar and spindles oscillate and revolve through this horizontal plane as the doffing plate rotates. The oscillation of the picking bars disposes the spindles during the doffing operation so that their axes are substantially tangent to the circumference of the doffer.

A further problem arises in doffing the spindles because of the rotation of the spindles as they pass beneath the doffer. Failure to allow for rotation of the spindles has resulted in prior instances in winding the picked cotton about the spindle and thus decreasing the efficiency of the doffing mechanism.

The principal object of the present invention is to provide an apparatus for forming an improved cotton picker spindle in which the picking teeth are arranged thereon in a spiral or helix about the axis of the conical surface, so that, as the spindle rotates, the upper portions of the spiral pass beneath the doffer, lying substantially on the effective doffing circumference of the doffer.

A further object is to provide for the arrangement of the teeth with their picking points disposed toward the apex of the conical surface and with the points substantially along said spiral. This arrangement is in keeping with the basic theory of doffing the spindles from the base of the conical surface toward the apex thereof.

Another important object is to provide an apparatus for making the improved spindle, in which the spindle is carried in a means adapted to move along a linear path at intervals simultaneously with angular movement thereof and to apply a reciprocating cutting tool to the surface of the spindle to form spirally spaced picking teeth on the spindle surface between said intervals.

Still another object is to provide means in the apparatus for cutting the teeth in the desired spirally spaced manner, beginning at the apex of the spindle.

Still another object is to provide means in the apparatus for indexing the spindle after a complete spiral row of teeth is formed.

A further understanding of the objects and desirable features of the invention may be had from the accompanying sheets of drawings, in which:

Figure 3 is a longitudinal sectional view of the apparatus taken substantially along the line 3—3 of Figure 2;

Figure 4 is a transverse sectional view of an end portion of the apparatus taken along the line 4—4 of Figure 2, showing a portion of the drive means for the apparatus;

Figure 5 is an end view of the indexing plate comprising part of the indexing means;

Figure 6 is a detail sectional view of the cutting means, particularly showing the cutting tool;

Figure 7 is a perspective view of the tool bit;

Figures 8 and 9 are elevational views of two modified forms of the improved picking spindle;

Figure 10 is a diagrammatic view illustrating the grinding operation for sharpening the picking points; and, Figure 11 is an enlarged view of a portion of the spindle, showing the shape of the tooth after grinding.

Figure 1:
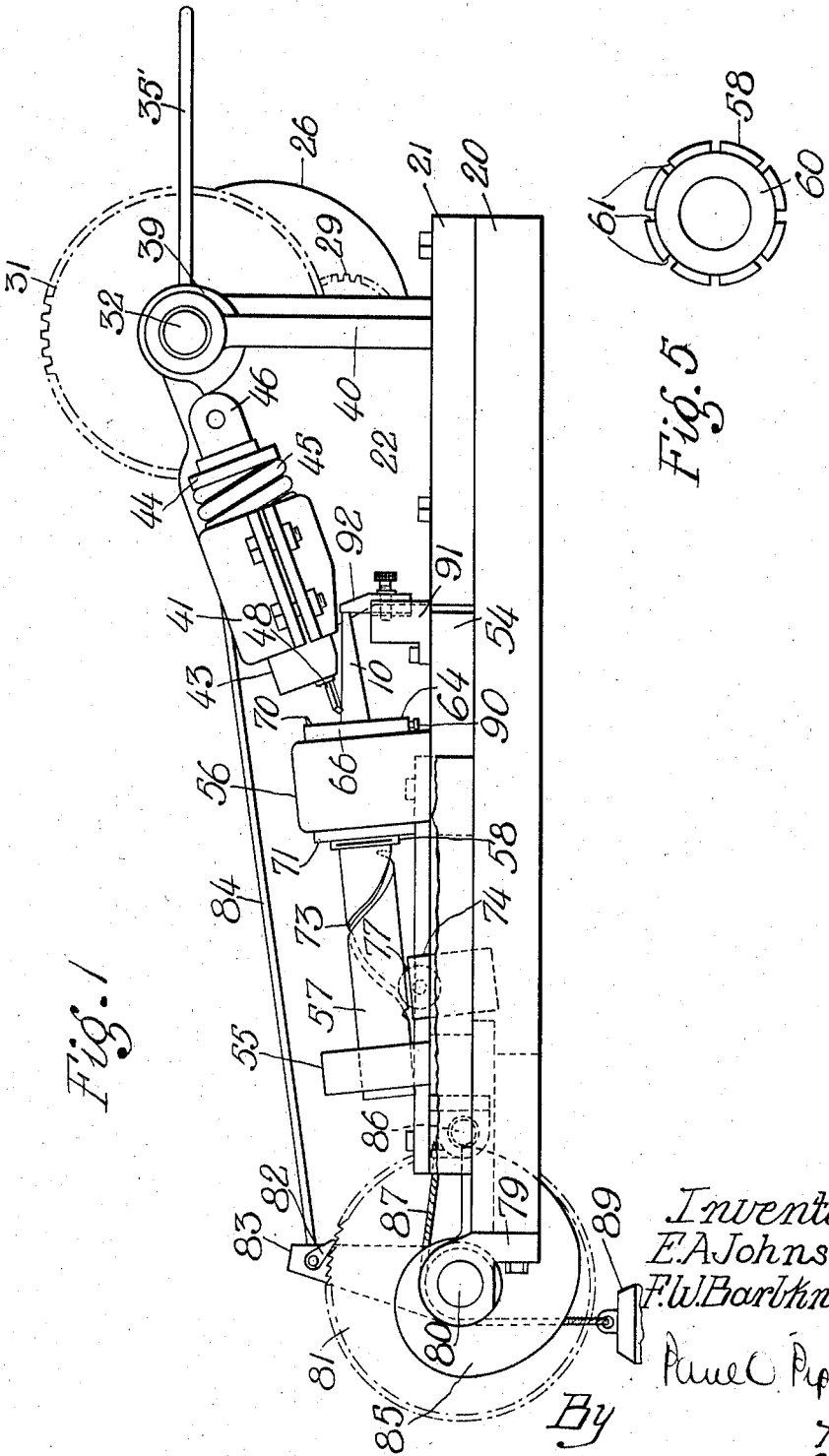
Figure 1 is a side elevational view of the apparatus for forming the teeth on the picking spindle.

As best shown in Figure 8, a spindle 10 is formed integrally with a shank 11 and has a conical surface 12, on which a plurality of rows of spirally spaced picking teeth 13 are formed. The teeth 13 are formed from integral portions of the spindle and are cut therefrom in a manner which will appear later in the description of the method and apparatus for performing the cutting operation. The conical surface 12 is provided with a plurality of rows of teeth, each row being in the form of a long, regular spiral formed about the axis of the spindle and preferably encircling the conical portion but once. As each tooth 13 is formed, it is turned radially outwardly and circumferentially of the spindle for the purpose of disposing the point of the tooth generally in the direction of rotation of the spindle. It will be noted that each tooth is triangular in shape and the sides thereof are arranged with reference to the shape and disposition of the spiral row in which the teeth are arranged, so that the point extends along the spiral. The picking teeth are further defined by a grinding operation (Figure 10), that points the teeth for more efficient picking. By this operation each tooth is treated by a grinding wheel which removes a portion of the tooth and sharpens the same, as at 13a. This provision renders the teeth sufficiently aggressive to obtain the efficient picking and further permits efficient doffing. The manner in which the spindles are arranged and doffed is shown in Patent No. 2,140,631, supra, and in applicant Johnston's copending application Serial No. 242,238, filed November 25, 1938.

In the modified form of spindle shown in Figure 9, each row of teeth 13 is arranged in a spiral flute 14, there being a plurality of flutes about the spindle in which the rows of teeth are respectively arranged. In this type of spindle, the points of the teeth 13 fall substantially within the conical plane of the spindle surface.

The apparatus for forming the teeth on the spindles comprises a main support or base 20, which may be rigidly attached to a table or bench. At one end of the base 20 there is rigidly secured a bearing support or bracket 21, which has an upwardly extending wall 22 disposed longitudinally of the base 20. The bracket further includes a second wall 23 transversely spaced from and parallel to wall 22. The wall 23 is formed with an outwardly extending, integral bearing sleeve 24 formed with a transverse bore for rotatably carrying a shaft 25. The outer end of the shaft 25 carries for rotation therewith a pulley wheel 26 and the inner end of the shaft has keyed thereto a driving pinion 27. The wall 23 serves also to journal a second shaft 28, which at its inner end carries a large gear 29 and a small pinion 30, both of which are keyed to the shaft and the first of which meshes with the driving pinion 27. The pinion 30 meshes with a large gear 31 journaled on a transverse shaft 32 journaled in the walls 22 and 23 of the support or bracket 21. The gear 31 is associated in constant driving relation with a clutch member 33 having clutch teeth 34 formed thereon. A complementary clutch member 35, having clutch teeth 36, is keyed to the shaft 32 and is axially slidable thereon in a keyway 37 formed in the shaft. A shifter rod 35' is provided for shifting the clutch member 35 into and out of engagement with the clutch member 33 for establishing and disconnecting driving relation between the drive gearing and the shaft 32.

The outer end of the shaft 32 has keyed thereto a crank arm 38. The inner end of the shaft carries an eccentric or cam 39 keyed thereon and disposed between the wall portion 22 and an auxiliary supporting portion 40. This latter portion is rigidly carried by the bracket or support 21 and serves to journal the innermost end of the shaft 32.

The wall 22 carries an integral, longitudinal sleeve portion 41 disposed at a point longitudinally spaced from the shaft 32. This sleeve portion is preferably split and is formed with a central bore 42 in which a ram 43 reciprocates. The ram and sleeve are keyed together to prevent relative angular movement therebetween. The ram is provided at one end with an annular flange 44, and a coil spring 45 is disposed between this flange and the proximate end of the sleeve portion 41. This end of the ram is further provided with a pair of transversely spaced ears 46, between which is journaled a bearing 47 engaging the eccentric surface of the cam 39. Rotation of the shaft 32 and cam 39 reciprocates the ram 43 in the sleeve 41, the spring 45 serving to return the ram always toward the shaft 32.

The axis of reciprocation of the ram is disposed at an angle to the horizontal surface of the base 20, and the ram reciprocates in a vertical plane passed longitudinally through the base. A tool bit 48 is rigidly carried by the free end of the ram and comprises part of the cutting means, of which the reciprocating ram is also a part. As best shown in Figures 6 and 7, the tool bit 48 is preferably square in cross section and is positionably carried by a holder 49 rigidly carried by the ram 43. The bit 48 is disposed in the holder 49 with a corner edge of the square arranged at its under side. The free end of the tool bit is ground off at an angle to the axis of the bit to provide a rectangular surface 50. The under edge or corner of the square is substantially longer than the upper edge and, in conjunction with the surface 50, forms a cutting point 51. The lower edges of the ground-off rectangle form cutting edges 52 and 53. The rectangular surface 50 thus adjoins the cutting edges 52 and 53 and extends from the point 51 to form a turning or deflecting surface, as will hereinafter appear. It will be noted that the plane of the surface 50 is at an angle with respect to the longitudinal axis of the ram 43 and at an angle with respect to a plane passed at right angles to the ram or reciprocation axis.

From an examination of Figures 8 and 9, the function of the cutting edges and surface of the tool bit 48 will be apparent. The point 51 enters the surface of the spindle at an oblique angle and the cutting edges 52 and 53 cut or indent the spindle surface in a gradually widening and deepening path to displace an integral portion thereof to form a gradually widening tooth 13. The angle of the deflecting surface 50 is so arranged that it turns or displaces the tooth portion radially outwardly and circumferentially of the spindle and generally toward the apex of the conical portion, as previously described. This simple method cuts a desirable type of tooth on the surface of the spindle wherein the tooth is so arranged as to permit effective picking and doffing. It will be understood, of course, that the operation of cutting a tooth is repeated a sufficient number of times to form a plurality of teeth on the conical surface 12 of the spindle 10.

The apparatus is further provided with means for supporting the spindle in position to be cut but the cutting means 43, 48. This supporting means comprises a carriage 54 mounted for movement on and longitudinally with respect to the base 20. The carriage is provided with a pair of longitudinally spaced, substantially vertically extending supports 55 and 56, which serve to carry, for angular movement, a shaft or member 57. This shaft or member extends longitudinally of the base and carriage and is disposed at a slight angle to the horizontal surface of the base. The support 56 is in close proximity to the cutting end of the cutting means 43, 48 and carries therein an indexing means 58, which serves to carry one end of the shaft or member 57. The indexing means comprises a member having a sleeve 59 carried by the support 56 and an integral flange 60. The flange 60, as best shown in Figure 5, is provided with a plurality of circumferentially spaced notches 61 open to the periphery of the flange. The sleeve 59 of the member has a pair of diametrically opposed slots 62 formed therein. These slots are adapted to be engaged by a pin 63 carried by the shaft or member 57, the connection serving to mount the sleeve and shaft for rotation together. The indexing means further includes a member 64, which comprises an integral sleeve portion 65 and a flange portion 66. The sleeve portion 65 fits within the sleeve 59 and is formed with a circumferential groove 67, which is engaged by a set-screw or detent means 68 carried by the sleeve 59. The member 64 is thus angularly movable with respect to the sleeve 59, but the screw or detent means 68 prevents relative axial movement between the two. The flange 66 formed on the member 64 is provided with a radial slot 69 open to the flange periphery. A spring pressed catch member or pawl 70 is pivotally carried by the flange 66 within this slot and one end of the member or pawl is adapted to be optionally engaged with the slots 61 formed in the flange 60. The member 64 may thus be angularly positioned with respect to the flange 60 by disengaging the pawl 70 from one notch 61 and engaging it with another notch. The member comprising the sleeve 59 and flange 60 is held in the support 56 by means of a nut 71 threaded on one end thereof. The support 56 is cut out, as at 72, to accommodate the flange 60 and to permit free movement of the catch member or pawl 70.

The shaft or member 57 is provided with a spiral groove or helix 73, which is proportionate to the spiral arrangement of the teeth 13 on the spindle 10 and which adapts the spindle to the tooth cutting operation, as will appear later. The base 20 carries a following means 74 comprising a vertically extending sleeve 75, in which is carried a spring pressed plunger 76 including a rotatable follower wheel 77. The spring pressed plunger 76 is urged upwardly and the wheel 77 is thus maintained in engagement with the spiral or helix 73. A longitudinal slot 78 is formed in the carriage 54 to accommodate the following means 74 as the carriage 54 moves longitudinally with respect to the base 20.

The end of the base 20 opposite the end which carries the cutting means is provided with a pair of transversely spaced brackets 79 which serve to journal a transverse shaft 80. The shaft 80 carries for rotation therewith a ratchet wheel 81, which is engaged by a pawl 82 carried on an arm 83 loosely carried on the shaft 80. The pawl-carrying arm is connected by a longitudinally extending link 84 to the crank arm 38 on the shaft 32 previously described. Rotation of the shaft 32 oscillates the crank arm 38 to actuate the ratchet wheel 81 and shaft 80. The other end of the shaft 80 carries for rotation therewith a large cam 85, the eccentric surface of which engages a transverse pin 86 carried by the carriage 54. As the crank arm 38 is oscillated by the shaft 32, the pawl and ratchet mechanism 81, 82 causes step-by-step rotation of the cam 85, which is translated into step-by-step longitudinal or linear movement of the carriage 54, and the carriage is thus moved at intervals toward the cutting means 43, 48 for a predetermined period or length of travel. The surface of the cam 85 is provided with an abrupt change and means are provided for returning the carriage to starting position. This means comprises a cord or cable 87 connected to the carriage 54 and trained about a pulley wheel 88 loosely carried on the shaft 80. The other end of the cord or cable 87 is connected to a weight 89 of sufficient size to return the carriage to starting position.

From the description thus far, it will be seen that, as the pawl and ratchet means moves the carriage longitudinally along the base 20, the shaft 57 is caused to move angularly because of the engagement between the spiral or helix 73 and the follower means 74. Similarly, when the cam 85 reaches its highest point and abruptly changes to its lowest point, the weight 89 returns the carriage to starting position and at the same time the angular movement of the shaft 57 is reversed. From this it will be seen that the starting position of the shaft 57 is exactly the same at all times when the carriage is returned, with respect to both angular and longitudinal movement.

The spindle 10 is supported by the member 64 by means of a longitudinal bore in the member, which is adapted to receive the shank 11 of the spindle. As previously mentioned, the axis of the spindle supporting means, comprising the shaft 57 and the members 64 and 59, 60, is disposed at a slight angle with respect to the horizontal surface of the base 20. When the spindle is mounted in the member 64, its conical portion extends therefrom toward the cutting means 43, 48, and the element of the conical surface at the upper portion of the spindle is disposed in a horizontal plane or lies along a line parallel to the horizontal surface of the base 20. The spindle is held in position in the member 64 by means of a set-screw 90 which engages the spindle shank 11. The carriage is provided with a further support 91 at one end thereof, which includes an adjustable and readily removable part 92 having a small opening therein which receives the apex of the conical spindle. This construction is best shown in Figure 3.

In the operation of the apparatus, the spindle 10 is mounted in the spindle supporting means, as previously described, with the upper element of the conical surface lying in a horizontal plane substantially parallel to the linear or longitudinal path along which the carriage 54 moves. The arm 43 reciprocates in a vertical plane that includes the linear path and the slight angle at which it is disposed provides for the depth of the integral portions, which are displaced to form the picking teeth 13. The parts as shown in the drawings are illustrated as having reached the ends of their respective movements; that is, the carriage 54 has moved toward the cutting means to its fullest extent of travel, and, as will be seen from the position of the cam 85 in Figure 1, the next movement of the pawl and ratchet means will result in a return movement of the carriage to starting position. The cam 39, which drives the cutting means, is also at its most extreme position, having caused the tool bit 48 to enter the surface of the spindle to its fullest extent, and the next movement of the cam will result in the return of the cutting means to the other end of its reciprocating stroke.

One complete cycle of the operation of the apparatus results in the formation of a plurality of teeth 13 in a spiral row on and about the conical surface of the spindle 10. The cutting of the teeth begins at the apex of the cone and continues at intervals toward the base of the cone until the position shown in the drawings is reached, after which the carriage 54 is returned to starting position. Because of the pawl and ratchet means and the cam 85, the step-by-step movement is imparted to the carriage, which, of course, results in a simultaneous step-by-step angular movement of the spirally grooved shaft or member 57. Thus the spindle is moved at intervals along a linear path and is simultaneously moved angularly about its axis. In other words, a particular point on the conical surface of the spindle is caused to move in a spiral path traced about the axis of the spindle. The relation between the cams 39 and 85 is such that the cutting means is actuated to cut a tooth in the surface of the spindle only between the intervals of the aforesaid longitudinal and angular movement. This may be further appreciated by noting that the pawl-carrying arm 83 is being returned over the ratchet wheel 81 while the tool bit 48 is being reciprocated to cut a tooth.

Figure 2:
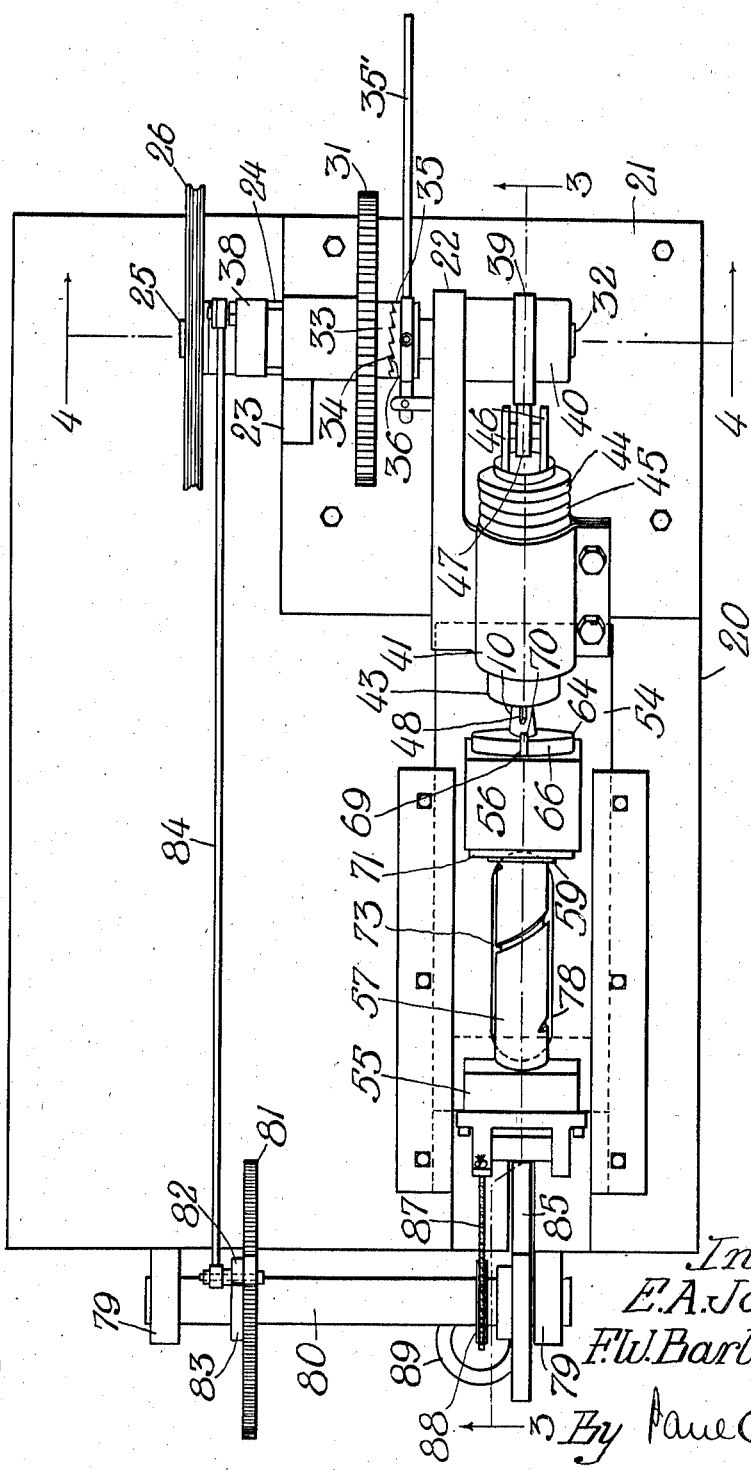
Figure 2 is a plan view of the same.

As best shown in Figure 2, the linear movement of the spindle and the reciprocation of the cutting means are in the same vertical plane. The particular movement of the point 51 of the tool bit 48 is slightly downwardly toward the axis of the spindle and simultaneously along the surface of the spindle toward the base of the cone. This movement, in conjunction with the shape of the cutting end of the tool bit, forms a tooth 13, as previously described.

After one complete spiral row of teeth has been cut, the carriage, as aforesaid, is returned to starting position. As also previously mentioned, the position of the tool supporting means is identical with the position of the same before the first movement thereof. It is at this time necessary to change the angular position of the spindle with respect to the shaft or member 57. This is simply and easily accomplished by the indexing means previously described. The catch member or pawl 70 is pressed downwardly to disengage the same from a notch in the flange 69 and the member 64, together with the spindle 10, is moved angularly until the catch is alined with a desired notch in the flange 69. Operation of the apparatus is repeated to cut another spiral row of teeth, after which the carriage is again returned and the indexing operation repeated. It is necessary to repeat the indexing operation a number of times equal to the number of spiral rows desired on the spindle. It will be appreciated from this that the member 59, 60 may be readily removed from the support 56 and replaced by another having a different number and arrangement of notches therein. The entire assembly of the parts 56, 57, 59 and 64 has been made with a view toward ready assembly and disassembly thereof. The same arrangement has been made with respect to the removal and mounting of spindle 10 in the member 64, the set-screw 90 being easily tightened or loosened and the supporting part 92 being readily positionable to accomplish this purpose. The shifter fork 38 may be easily actuated to disengage the driving relation between the gear 31 and the shaft 32 while the indexing operation is being performed.

The foregoing description of the apparatus pertains to its operation on a spindle of the type shown in Figure 8. A substantially identical operation is performed to form picking teeth shown on the spindle in Figure 9, but, because of the spiral flutes which are recessed from the conical surface of the spindle, the tool bit 48 must be adjusted farther outwardly and downwardly. This is a comparatively simple procedure and any suitable means may be employed therefor.

From the foregoing description it will be seen that a desirable apparatus for and method of forming an improved cotton picker spindle have been devised. The method and operation consist broadly in moving the spindle at intervals in a linear path and simultaneously therewith rotating the spindle during the same intervals about its axis, between which intervals the teeth are formed in spirally spaced arrangement on and about the surface of the spindle.

It will be understood that the invention may be utilized in connection with spindles that are perfectly cylindrical and that variations may be made in the form of teeth and the spacing thereof. It will be further understood that numerous other alterations and modifications may be made in the apparatus, procedure and the improved spindle without departing from the spirit and scope of the appended claims.

What is claimed is:

1. In a machine for cutting a member having a conical surface formed about an axis, the combination of a horizontal base, a cutting tool mounted on the base for reciprocating movement at an angle to the horizontal base, a carriage mounted on the base for step-by-step movement along a linear path lying in the plane of reciprocation of the tool and from a starting position toward the tool, a member supporting means carried by the carriage and angularly positionable therein, said means being adapted to rigidly carry the member with its apex toward the tool and with an element of the conical surface disposed horizontally, reciprocation of the cutting tool engaging and cutting the conical surface of the member at spaced portions between the aforesaid intervals beginning substantially at the apex of the cone, and means for returning the carriage to the aforesaid starting position after a predetermined travel thereof toward the tool, the aforesaid supporting means being positionable in the carriage to aline another portion of the surface of the member with the cutting tool.

2. In a machine for cutting an element having a curved surface of generation formed about an axis, the combination of a base, a carriage carried by the base for movement back and forth in a linear path, a rotatable cam carried by the base and having an involute surface engageable with the carriage for moving the carriage in one direction, said cam surface including a drop-off portion, means engaged with the carriage and urging the carriage against movement by the cam, said means returning the carriage when the drop-off portion reaches its point of engagement with the carriage, means carried by the carriage for carrying the element to be cut, a reciprocal cutting tool carried by the base for cutting the element, said tool comprising a carrier mounted for reciprocation in the plane of the aforesaid linear path, a shaft journalled on the base, means on the shaft for reciprocating the tool, step-by-step means for rotating the cam, and means operatively connected between the shaft and the step-by-step means to actuate the latter.

3. In a machine for cutting an element having a curved surface of generation formed about an axis, the combination of a base, a carriage carried by the base for movement back and forth in a linear path, a rotatable cam carried by the base and having an involute surface engageable with the carriage for moving the carriage in one direction, said cam surface including a drop-off portion, means engaged with the carriage and urging the carriage against movement by the cam, said means returning the carriage when the drop-off portion reaches its point of engagement with the carriage, means carried by the carriage for carrying the element to be cut, said means comprising a member rotatable with respect to the carriage about an axis lying in the plane of the aforesaid linear path, said member including a worm, means carried by the base and engageable with the worm in said member for rotating the member, a reciprocal cutting tool carried by the base for cutting the element, said tool comprising a carrier mounted for reciprocation in the plane of the aforesaid linear path, a shaft journalled on the base, means on the shaft for reciprocating the tool, step-by-step means for rotating the cam, and means operatively connected between the shaft and the step-by-step means to actuate the latter.

4. In a machine for cutting a member having a conical surface formed about an axis, the combination of a horizontal base, a cutting tool mounted on the base for reciprocating movement at an angle to the horizontal base, a carriage mounted on the base for step-by-step movement along a linear path lying in the plane of reciprocation of the tool and from a starting position toward the tool, a support on the carriage including a cylindrical recess, a member supporting chuck including a cylindrical shank carried in the recess in the support and angularly positionable therein, latch means carried by the chuck and engageable with the support, said means being releasable and re-engageable with the support at any one of a plurality of angular positions of the chuck as respects the support, said chuck being adapted to rigidly carry the member with its apex toward the tool and with an element of the conical surface disposed horizontally, reciprocation of the cutting tool engaging and cutting the conical surface of the member at spaced portions between the aforesaid intervals beginning substantially at the apex of the cone, and means for returning the carriage to the aforesaid starting position after a predetermined travel thereof toward the tool, the aforesaid chuck being positionable in the carriage to aline another portion of the surface of the member with the cutting tool.

5. In a machine for cutting a member having a surface formed about an axis, the combination of a horizontal base, a cutting tool mounted on the base for receiprocating movement at an angle to the horizontal base, a carriage mounted on the base for step-by-step movement along a linear path lying in the plane of reciprocation of the tool and from a starting position toward the tool, a member supporting means carried by the carriage and angularly positionable therein, said means being adapted to rigidly carry the member with its axis disposed in the plane of the linear path, reciprocation of the cutting tool engaging and cutting the surface of the member at spaced portions between the aforesaid intervals, and means for returning the carriage to the aforesaid starting position after a predetermined travel thereon toward the tool, the aforesaid supporting means being positionable in the carriage to aline another portion of the surface of the member with the cutting tool.

EDWARD A. JOHNSTON.
FRED W. BARBKNECHT.